July 27, 1965  G. JUNGBLUTH  3,196,853
CIRCULAR PISTON MACHINE, ESPECIALLY CIRCULAR PISTON
INTERNAL COMBUSTION ENGINE
Filed March 4, 1963

Inventor:
Georg Jungbluth
By

United States Patent Office 3,196,853
Patented July 27, 1965

3,196,853
CIRCULAR PISTON MACHINE, ESPECIALLY CIRCULAR PISTON INTERNAL COMBUSTION ENGINE
Georg Jungbluth, Cologne-Deutz, Germany, assignor to Klöckner - Humboldt - Deutz Aktiengesellschaft, Cologne, Germany
Filed Mar. 4, 1963, Ser. No. 263,095
Claims priority, application Germany, Mar. 3, 1962, K 46,068
3 Claims. (Cl. 123—8)

The present invention relates to a circular piston machine, especially a circular piston internal combustion engine. Inasmuch as circular piston internal combustion engines have a relatively very short stroke, which means that assuming the same piston displacement a circular piston internal combustion engine has a very large piston surface with regard to an internal combustion engine with a reciprocable piston, it will be appreciated that at the same ignition pressures, the forces in a circular piston internal combustion engine are considerably greater than the forces in an internal combustion engine with reciprocable piston. It will furthermore be obvious that also those forces will be very great which have to be transmitted between the outer body of a circular piston internal combustion engine and the end parts which support the bearing means for the eccentric shaft. The said forces are so great that a safe connection between the respective parts by mere frictional connection is hardly possible.

It is known to provide such engines with a cylindrical fit between the outer body and the end parts. This construction, however, has the drawback that at the short axis of the outer body which is under the influence of high gas forces, the power path to the abutment surface is rather long which fact might bring about a wear between the outer body and the end parts in engagement therewith. Furthermore, a very precise play-free fit of the cylindrical fitting surfaces is required which additionally has the drawback that after assembling and disassembling the arrangement several times, the said fitting surfaces will prematurely wear and lose their precision.

It is, therefore, an object of the present invention to provide a circular piston machine, which will overcome the above mentioned drawbacks.

It is a further object of this invention to provide a circular piston machine which will not require a precision fit between the outer body and the end parts connected thereto.

Figure 1:
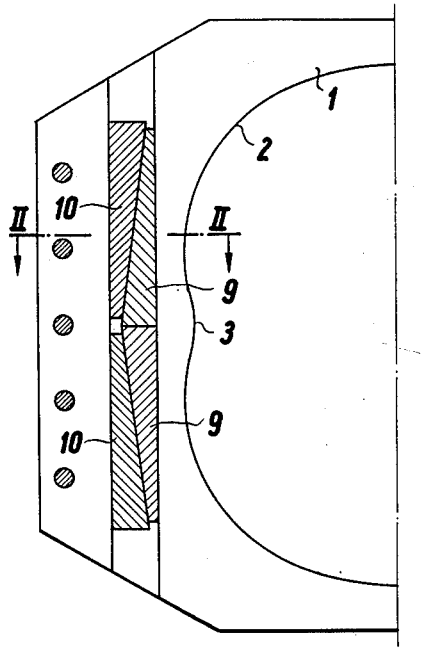

These and other objects and advantages of the invention will appear more clearly from the following specification in connection with the accompanying drawing, in which:

FIG. 1 diagrammatically illustrates that portion of the outer body of a circular piston internal combustion engine at which the connection with the end parts of the circular piston internal combustion engine is effected.

Figure 2:
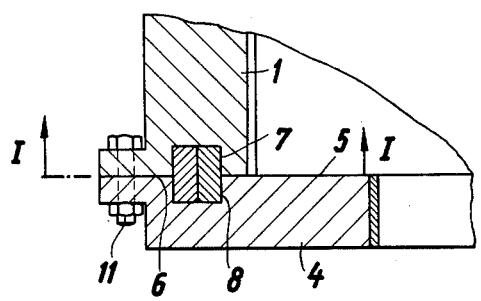

FIG. 2 represents a section along the line II—II of FIG. 1.

The present invention is characterized primarily in that the end parts of the circular piston internal combustion engine are provided with plane end surfaces which are engaged by the respective adjacent end surfaces of the outer body. The invention is furthermore characterized in that the adjacent surfaces of said outer body and end parts are provided with oppositely arranged grooves in which wedge members are located adapted to be moved relative to each other so as to be clamped against each other and the respective adjacent surfaces of said outer body and end parts therefor. In this way, said wedge members exert a clamping force in the direction of the contacting surfaces of said outer body and said end parts.

With a circular piston internal combustion engine in which the inner surface of the outer body corresponds to the contour of an epitrochoid with axis-near zones, it is particularly advantageous to arrange the clamping wedge members adjacent said axis-near zones so as to face each other. The spaces for receiving the clamping wedge members have a parallelogram-shaped cross section. Advantageously, the end parts are screwed to the outer body of the machine.

Referring now to the drawing in detail, the arrangement illustrated therein comprises the outer body 1 of an internal combustion engine. This outer body is shown after the adjacent end part of the machine has been removed so that its inner contour 2 will be visible. The inner contour or inner confining surface 2 corresponds to an epitrochoid with two axis-near zones 3, one only being shown in the drawing.

FIG. 2 shows one of the end parts of the circular piston internal combustion engine. These end parts 4 have their plane surfaces 5 in engagement with plane end faces 6 of the outer body 1. Arranged in the end faces 5 and 6 are oppositely located grooves 7 and 8 which together confine chambers of a parallelogram-shaped cross section. Arranged in said chambers are clamping wedges 9 and 10 which exert their clamping forces in the direction of extension of the surfaces 5 and 6. The outer body 1 and the end parts 4 are connected to each other by screw bolts 11.

As will be evident from the above, an arrangement according to the invention has the advantage that a precise fitting with regard to the connection between the outer body and the end parts will not be necessary. The clamping wedges permit a positive connection adjacent those places where the forces act. The clamping wedges thus prevent a wear at the surfaces engaging each other. Since the clamping wedges are inserted into grooves, the surfaces which engage each other are free from steps and thus can be machined in a continuous operation. The clamping wedges do not require any material precision of the grooves inasmuch as they adapt themselves automatically to any tolerances in the grooves.

It is, of course, to be understood that the present invention is, by no means, limited to the particular construction shown in the drawing but also comprises any modifications within the scope of the appended claims. In this connection, it should also be noted that while the invention has been described in connection with a circular piston internal combustion engine, it is, by no means, limited thereto.

What I claim is:

1. A circular piston machine, especially circular piston internal combustion engine, having a rotary piston, which comprises: an outer body having a central section provided with an inner substantially epitrochoidal surface for cooperation with said piston and also provided with planar end faces, said surface including regions nearer to the axis of the body than other regions of the surface, said outer body also including end members provided with planar end faces respectively engaging the said end faces of said central section, the end faces of said central section and the respective end faces of said end members in engagement therewith being provided with registering parallel walled grooves rectangular in cross section and extending substantially perpendicular to a line passing through the axis of said body and also through said regions nearer to the axis of said body, said grooves being open at the ends, and overlapping wedge means located in and substantially filling the cross section of said grooves and adjustable relative to each other, said wedge means being so arranged as to exert a clamping force in the direction of the plane in which the respective said end faces engage each other.

2. A machine according to claim 1, which includes screw means for connecting said end members to said central section and disposed on the opposite side of said groove means from the axis of said body.

3. A machine according to claim 2, in which said wedge means includes two first wedge members in end to end engagement and tapering inwardly toward the outer ends of the grooves and two second wedge members overlapping said first wedge members and tapering inwardly toward the center of the grooves, the plane of engagement of said wedge members being perpendicular to the plane of engagement of said end faces.

References Cited by the Examiner

UNITED STATES PATENTS

| 525,775 | 9/94 | Wainwright | 285—421 |
| 1,692,798 | 11/28 | Potter | 285—421 |
| 2,417,025 | 3/47 | Volpin | 285—421 |
| 2,853,329 | 9/58 | Guhman | 285—421 |
| 3,003,793 | 10/61 | Pitt | 285—421 |

FOREIGN PATENTS

| 39,120 | 10/09 | Australia. |
| 497,807 | 9/19 | France. |
| 542,203 | 1/32 | Germany. |

JOSEPH H. BRANSON, Jr., *Primary Examiner.*